United States Patent [19]

Imataki

[11] 4,227,229

[45] Oct. 7, 1980

[54] LIGHTNING ARRESTER DEVICE

[75] Inventor: Mitsumasa Imataki, Amagasaki, Japan

[73] Assignee: Mitsubishi Denki Kabushiki Kaisha, Tokyo, Japan

[21] Appl. No.: 22,360

[22] Filed: Mar. 20, 1979

[30] Foreign Application Priority Data

Mar. 20, 1978 [JP] Japan ........................... 53/42070[U]

[51] Int. Cl.[2] ............................................... H02H 9/04

[52] U.S. Cl. .................................... 361/117; 361/120; 361/127

[58] Field of Search ............... 361/117, 120, 126, 127, 361/128, 129, 130; 313/313

[56] References Cited

U.S. PATENT DOCUMENTS

| | | | |
|---|---|---|---|
| 3,649,875 | 3/1972 | Nagai et al. | 361/130 |
| 3,842,318 | 10/1974 | Nitta | 361/130 |

*Primary Examiner*—Harry E. Moose, Jr.

*Attorney, Agent, or Firm*—Wenderoth, Lind & Ponack

[57] ABSTRACT

A main arrester body is formed of a stack of superposed nonlinear resistors composed of sintered zinc oxide and longitudinally disposed within an enclosed housing filled with $SF_6$. A plate-shaped conductor extends from the higher voltage end of the stack to run radially outward and downward, and a lead is connected to the conductor to be transversely extended and sealed through the housing until it is connected to a horizontally disposed bus.

11 Claims, 9 Drawing Figures

LIGHTNING ARRESTER DEVICE

BACKGROUND OF THE INVENTION

This invention relates to a lightning arrester device suitable for use in a gas insulation substation.

Enclosed lightning arrester devices of the conventional construction have comprised the grounded housing and the stack of superposed nonlinear resistors composed essentially of sintered zinc oxide and disposed therein. Since an electrostatic capacity developed between the grounded housing and each of the nonlinear resistors can not be disregarded with respect to that of each nonlinear resistor itself, there has been the disadvantage that the superposed nonlinear resistors unequally share the potential distribution at the applied commercial power frequency voltage so that those nonlinear resistors located on the incoming side have to bear the greater part of the voltage. Therefore the nonlinear resistors generate unevenly heat due to the commercial power frequency voltage and unevenly deteriorate in characteristics with the result that the lifetime of lightning arrester devices are much impeded.

In order to eliminate the abovementioned disadvantage, it has been alreadily proposed to extend an electrical conductor in the form of a rod or a plate from a high voltage side of the stack of the nonlinear resistors to run along and adjacent to the stack within the grounded housing. This measure has been effective for compensating for electrostatic capacities developed between the grounded housing and the nonlinear resistors thereby to cause the uniformity of a potential distribution along the stack of the nonlinear resistors superposed on and serially connected to one another.

Such a lightning arrester device has been generally vertically disposed and connected, for example, to the bus of gas insulation substations through a connecting electrical conductor extending therefrom. Accordingly the bus has been necessarily located above the device and therefore at a higher level. Alternatively, in order to decrease the height of the bus in view of the standpoint of the earthquake proof performance, the lightning arrester devices might be constructed to be suitable for installing them horizontally. This has resulted in an increase in floor area occupied by the devices suitable for extra-high voltages.

Accordingly, it is an object of the present invention to provide a new and improved lightning arrester device capable of being connected to a bus or a protected electrical appliance located at a lower level.

It is another object of the present invention to provide a new and improved lightning arrester device simple in both construction and assembly.

It is still another object of the present invention to provide a new and improved lightning arrester device most suitable for use in gas insulation substation and permitting the substations to be smaller in size and more economic than the prior art practice.

It is a further object of the present invention to provide a lightning arrester device having an improved structure suitable for connecting the device to a horizontally disposed bus.

It is a separate object of the present invention to provide a lightning arrester device having an improved structure by which a protected electrical equipment to be connected can be, as desired, disposed at a low position which lies within the height of the device proper and in which the maintenance and inspection of the lighting arrester device is easily effected.

SUMMARY OF THE INVENTION

The present invention provides a lightning arrester device comprising a housing, a main arrester body disposed within the housing axially thereof, a first electrical conductor extending from a higher voltage end of the main arrester body in a direction of length of the main arrester body to be disposed along the main arrester body, and a second electrical conductor connected to the main arrester body through the first electrical conductor to be disposed substantially perpendicularly to the longitudinal axis of the main arrester body.

Preferably, the second electrical conductor may be located between both ends of the main arrester body.

Advantageously, the housing may includes a tubular section extending therefrom to be substantially perpendicular to the longitudinal axis thereof while an electrically insulating spacer hermetically closes the tubular section and supports the second electrical conductor.

Alternatively, the second electric conductor may be connected to the first electrical conductor through a connecting seat, the connecting seat being welded to the first electrical conductor and bolted to the second electric conductor.

BRIEF DESCRIPTION OF THE DRAWINGS

The present invention will become more readily apparent from the following detailed description taken in conjunction with the accompanying drawings in which.

Throughtout the Figures like reference numerals designate the identical or corresponding components.

DESCRIPTION OF THE PREFERRED EMBODIMENT

Figure 1:
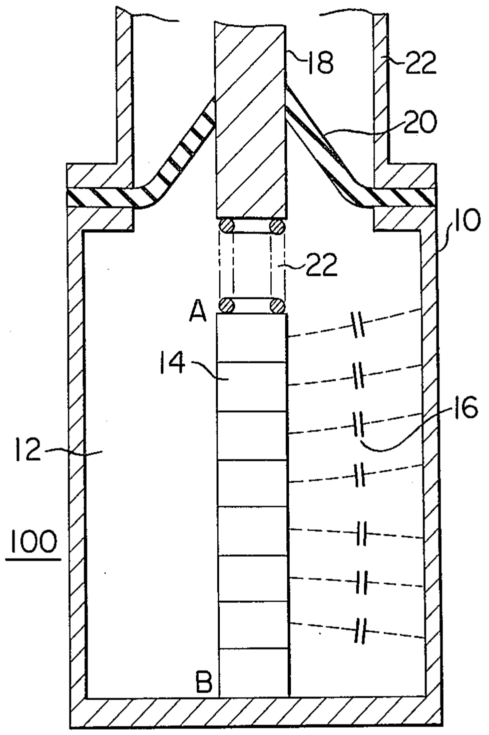
FIG. 1 PRIOR ART
FIG. 1 is a fragmental longitudinal sectional view of an enclosed lightning arrester device constructed in accordance with the principles of the prior art.

Referring now to FIG. 1 of the drawings, there is illustrated an enclosed lightning arrester device of the conventional construction. The arrangement illustrated comprises an enclosed lightning arrester device generally designated by the reference numeral 100 and including a grounded housing 10 defining an internal space 12 which is filled with an amount of an electrically insulating fluid such as sulfur hexafluoride ($SF_6$), and a main body of an arrester 14 disposed within the grounded housing 10 on the longitudinal axis thereof. The main arrester body 14 is formed of a stack of a plurality of nonlinear resistors superposed on and serially connected to one another. Each of the nonlinear resistors is also designated by the reference numeral 14 and, in this case, composed essentially of sintered zinc oxide. The main arrester body 14 includes an upper end A and a lower end B disposed at and electrically connected to the bottom of the housing 10 and each nonlinear resistor 14 forming the main arrester body has a stray capacity 16 between the same and the adjacent portion of the internal peripheral wall of the grounded housing 10. Then a connecting electrical conductor 18 in the form of a rod (which is called hereinafter a "lead") is disposed above and coaxially with the main arrester body 14 so that it hermetically extends through an electrically insulating spacer 20 which hermetically closes an upper end as viewed in FIG. 1 of the grounded housing 10. The connecting conductor 18 is electrically connected under a pressure to the upper end A of the main arrester body 14 through a compression spring 22 interposed therebetween. Another enclosed housing 22 is disposed at the open end on the spacer 20 to form an enclosed space filled with an amount of electrically insulating fluid, for example, sulfur hexafluoride ($SF_6$) and the lead 18 extends through the housing 22 until it is arranged to be connected to a protected electrical equipment or a bus although the electrical equipment or bus is not illustrated.

If any extraordinary surge is applied to an protected electrical equipment (not shown) connected to the lead 18 then the same can flow to ground through the nonlinear resistors 14 serially interconnected between the upper and lower end A and B respectively of the main arrester body 14. As a result, the protected equipment is prevented from rising in voltage due to the extraordinary surge.

On the other hand, lightning arrester devices are normally applied with the operating voltage. This voltage causes a flow of current thorugh the serially connected nonlinear resistors 14 with a magnitude suppressed to be small by means of the excellent nonlinear characteristic of the resistors 14 so that they can be used without the deterioration due to both heat generated therein and long service.

Also the nonlinear resistors 14 present low resistances before high current surges. However, the nonlinear resistors 14 that are formed essentially of zinc oxide act as electrostatic capacities rather than resistances on low currents normally flowing therethrough. Therefore, with the arrangement of FIG. 1 connected to an AC appliance, it is required to consider sufficiently these electrostatic capacities.

In the conventional construction of enclosed lightning arrester devices, the stray capacities exist between the nonlinear resistors 14 and the grounded housing 10 as shown in FIG. 1 and can not be disregarded with respect to the electrostatic capacities of the nonlinear resistors 14. Under these circumstances, there has been the disadvantage that the normally operating voltage at a commercial power frequency is applied across the stack of the serially connected nonlinear resistors 14 so that those nonlinear resistors located nearer to the upper end A of the stack bear the greater part of the voltage as shown in FIG. 2 wherein a potential at a point on the main arrester body 14 is plotted in ordinate against a position of that point in abscissa measured from the upper end A of the main arrester body 14.

Figure 2:
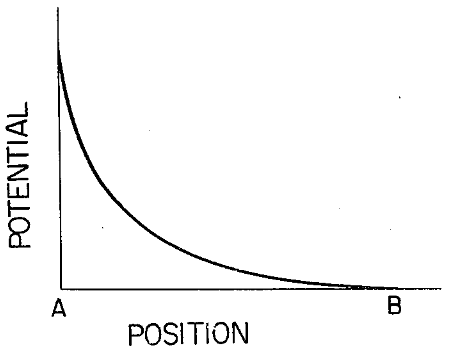
FIG. 2 PRIOR ART
FIG. 2 is a graph illustrating a potential distribution along the stack of superposed nonlinear resistors shown in FIG. 1.
Figure 5:
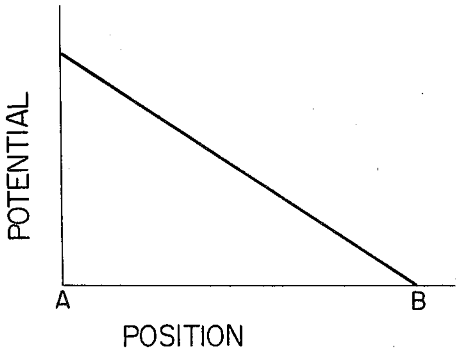
FIG. 5 PRIOR ART
FIG. 5 is a graph similar to FIG. 2 but illustrating the arrangement shown in FIGS. 3 and 4.

Upon the occurrence of a potential distribution such as shown in FIG. 2, the nonlinear resistors differently share a potential difference applied across the stack thereof or the main arrester body 14 and therefore, the normally applied voltage causes the nonlinear resistors to generate unevenly heat and deteriorate unevenly. This has resulted in conventional lightning arrester devices much reducing in lifetime.

Figure 3:
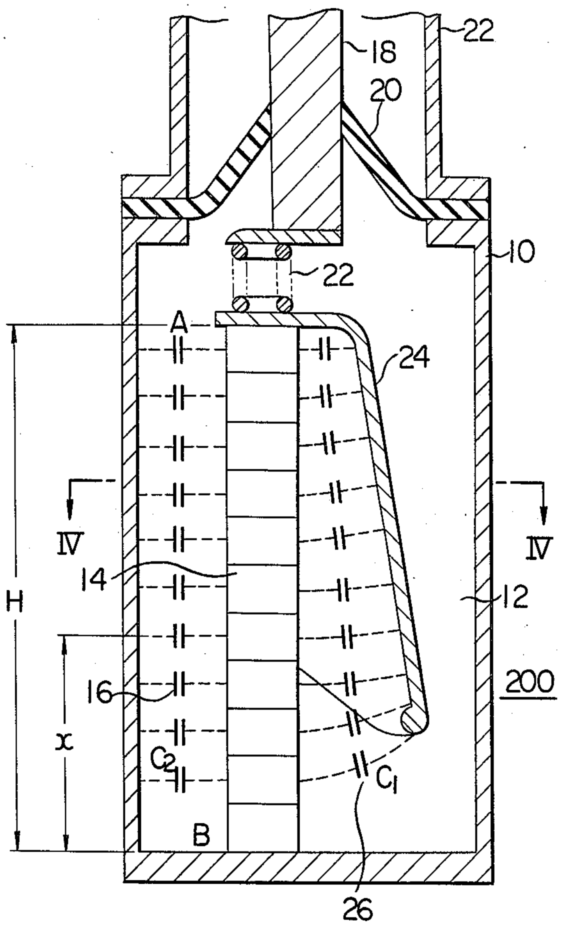
FIG. 3 PRIOR ART
FIG. 3 is a view similar to FIG. 1 but illustrating another enclosed lightning arrester device constructed in accordance with the principles of the prior art.

In order to eliminate the disadvantage of the prior art practice as above described, there has been already proposed an approach to extend an electric conductor in the form of a rod or a plate from the high voltage end of the stack of serially connected nonlinear resistors to run adjacent to and along the stack as shown in FIG. 3.

Figure 4:
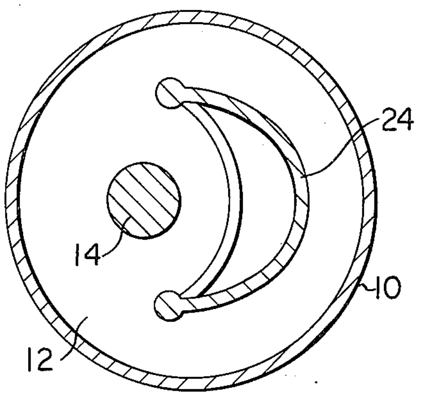
FIG. 4 PRIOR ART
FIG. 4 is a cross sectional view taken along the IV—IV of FIG. 3.

The arrangement illustrated comprises an enclosed lightning arrester device generally designated by the reference numeral 200 and different from that shown in FIG. 1 only in that in FIG. 3 the stack of the nonlinear resistors 14 is located to deviate more or less from the longitudinal axis of the grounded housing 10 and an electrical conductor 24 in the form of a rod or a plate extends from the upper or higher voltage end A of the stack of the nonlinear resistors 14 on that side thereof most distant from the internal peripheral wall surface of the grounding housing 10 to run radially outward and downward until it terminates at a predetermined distance from the bottom of the housing 10. The electrical conductor 24 forms electrostatic capacities 24 between the same and the nonlinear resistors 14. As best shown in FIG. 4, the electrical conductor 24 has a cross section in the form of a circular arc to compensate for the stray capacities 16 developed between the nonlinear resistors 14 and the grounded housing 10.

It is assumed that H designates the entire length of the stack of the superposed nonlinear resistors 14 and $C_1$ and $C_2$ designate electrostatic capacities 16 and 26 developed between that nonlinear resistor 14 located at a distance x measured from the inner bottom surface of the grounded housing 10 and the grounded housing 10 and between the same nonlinear resistor 14 and the plate-shaped conductor 26 respectively. Under the assumed condition, when the expression $$(C_1/C_1+C_2)=x/H$$

holds, the stack of the nonlinear resistors 14 has developed therealong a potential distribution approximating the ideal potential distribution as shown in FIG. 4 wherein the axes of ordinates and abscissas have the same meaning as those shown in FIG. 2.

From the foregoing it is seen that, by disposing the plate-shaped electric conductor 24, the stray capacities between the housing 10 and the nonlinear resistors 14 are compensated for to render a potnetial distribution along the stack of the nonlinear resistors 14 uniform and stable. This results in the formation of lightning arrester devices hign in reliability.

Figure 7:
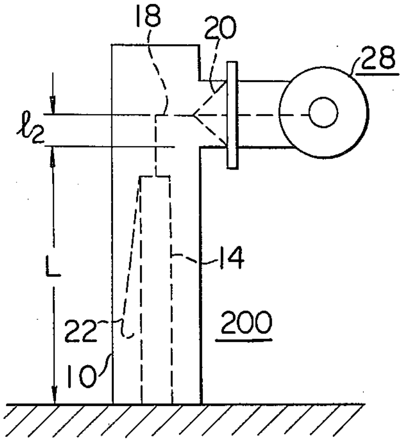
FIG. 7 PRIOR ART
FIG. 7 is a view similar to FIG. 6A but illustrating a modification of the lightning arrester device shown in FIG. 3 and connected to an associated bus.
Figure 6A:
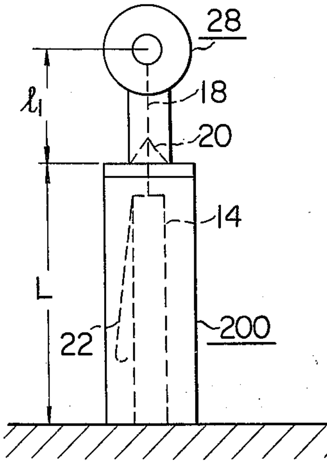
FIG. 6A PRIOR ART
FIG. 6A is a schematic side elevational view of the arrangement shown in FIGS. 3 and 4 and connected to an associated bus with some parts illustrated in phantom.
Figure 6B:
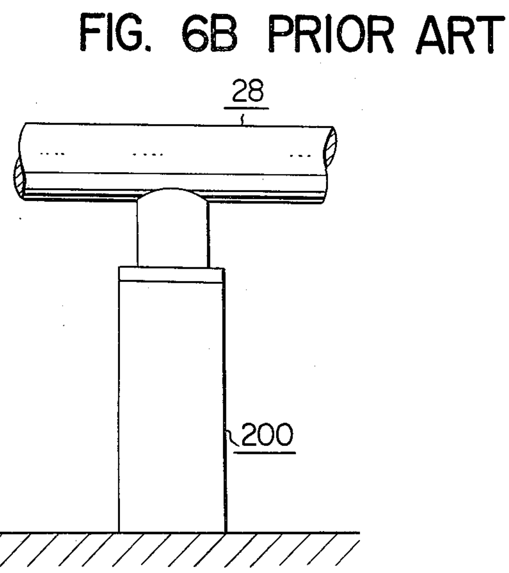
FIG. 6B PRIOR ART
FIG. 6B is a view similar to FIG. 6B but illustrating the arrangement of FIG. 6A after having been rotated through a right angle from its position shown in FIG. 6A.

The arrangement of FIG. 3 might be connected to, for example, a bus operatively coupled to a gas insulation substation in the manner as shown in FIGS. 6A and 6B or FIG. 7. In FIGS. 6A and 6B the lightning arrester device 200 is vertically disposed on the earth and connected through the lead 18 to a bus generally designated by the reference numeral 28 and horizontally disposed above the device 200. Assuming that L designates a height of the lightning arrester device 200 and $l_1$ designates a distance between that upper surface of the device 200 and the longitudinal axis of the bus 28, the latter is required to dispose horizontally the bus 28 at a height of $(L+l_1)$ above the earth.

In order to decrease the height of the bus 28, the lightning arrester device 200 can be modified to include the lead 18 extending externally of the grounded housing 10 to be perpendicular to the longitudinal axis of the serially connected resistors 14 as shown in FIG. 7. In this case, the bus 28 connected to the lead 18 is required to be horizontally disposed at a height of $(L+l_2)$ above the earth where $l_2$ designates a distance between a point that can be practically considered as the upper end of the device 200 and the longitudinal axis of the bus 18 and is less than the $l_1$.

In either case, the bus 28 should be horizontally disposed to be higher in level than the device 200.

With the earthquake-proof property thereof in view, the bus can be economically designed and instabled if it is disposed at a low level. Under these circumstance, the lightning arrester devices could be so designed and constructed that they are horizontally disposed on the earth. If it is attempted to operate conventional lightning arrester device of this construction with extra-high voltages then the disadvantage has resulted that the floor area occupied thereby increases because they become large-sized.

Figure 8:
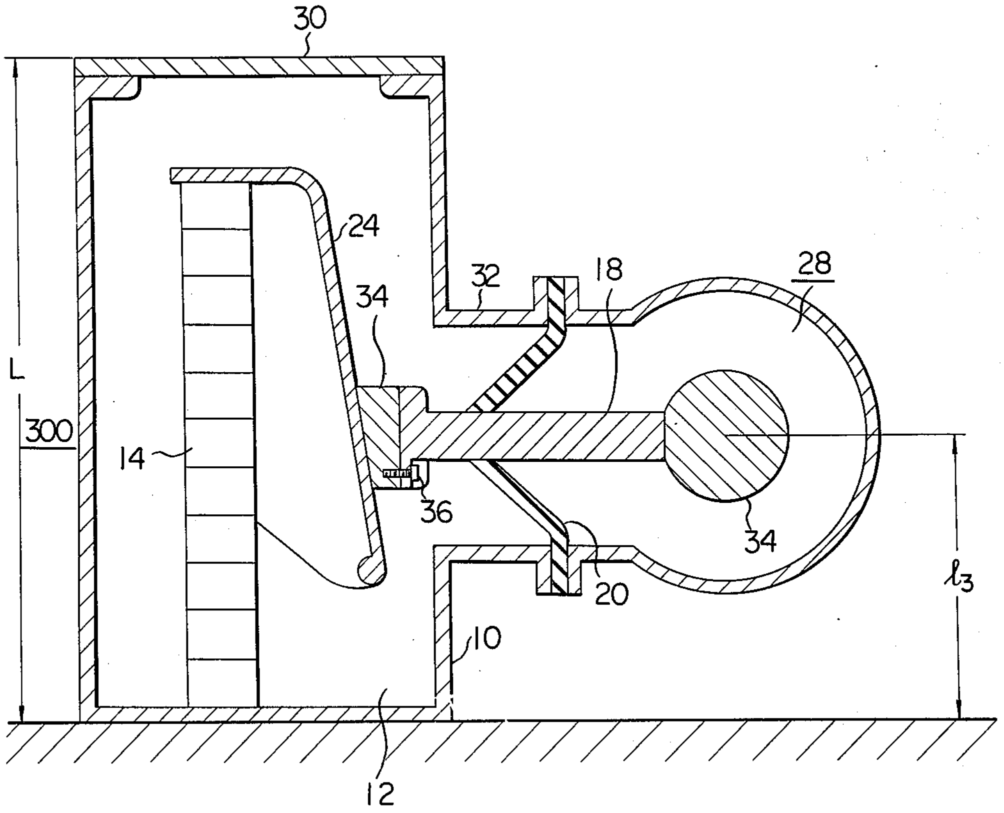
FIG. 8 is a longitudinal sectional view of a lightning arrester device constructed in accordance with the principles of the present invention and connected to an associated bus.

Referring now to FIG. 8, there is illustrated one embodiment according to the lightning arrester device of the present invention. In FIG. 8 the lightning arrester device is generally designated by the reference numeral 300 and comprise a housing 10, for example, in the form of a hollow cylinder including a bottom, an open end opposite to the bottom and firmly closed with a cover plate 30 and a short tubular section 32 extending from the peripheral wall of the housing 10 between the closed end and the bottom to be substantially perpedicular to the longitudinal axis of the housing 10.

The housing 10 is vertically disposed at the bottom on the earth to be connected to ground.

Within the housing 10 the stack of the nonlinear resistors 14 and the plate-shaped electrical conductor 24 are disposed in the same manner as above described in conjunction with FIG. 3 while the plate-shape conductor 24 faces the short tubular section 32.

Then the lead 18 is extended and sealed through the electrically insulating space 20 hermetically closing the tubular section 32 so that the lead 18 is supported by the spacer 20 so as to be horizontally disposed along the axis of the tubular section 32. Further the lead 18 is connected at one end to the plate-shaped conductor 24 through a connection seat 34 which is, in turn, fixedly secured to the plate-shaped conductor 24 as by welding and connected the lead 18 through bolts 38 only one of which is shown only for purposes of illustration.

On the other hand, the tubular section 32 is hermetically connected through the spacer 18 to a branch subsequently connected to an enclosed sheath for the bus 28 that is horizontally disposed. After having been extended and sealed through the spacer 18, the lead 18 is extended through the branch and is connected at the other end to the central conductor 34 coaxially disposed within the enclosed sheath for the bus 28.

Each of the housing 10, the branch and the bus sheath is filled with an amount of an electrically insulating gas such as sulfur hexafluoride ($SF_6$).

Therefore, in the arrangement of FIG. 8 the lead 18 is electrically connected via plate-shaped conductor 24 to the stack of the nonlinear resistors 14 to be substantially perpendicular to the longitudinal axis of the stack. Since the plate-shaped conductor 24 is connected at one end to the upper end of the stack of the nonlinear resistors 14 and runs toward the lower end thereof, the lead 18 may be connected to plate-shaped conductor 24 at any point located thereon to form a construction such as shown in FIG. 8 with the tube section 34 changed accordingly in level.

As shown in FIG. 8, the bus 28 can be horizontally disposed to have the longitudinal axis at a height of $l_3$ that is sufficiently smaller the entire height L of the lightning arrester device 300. That is, the bus 28 is sufficiently lower in level than the upper end of the device 300.

The present invention has several advantages. For example, a bus connected to the lightning arrester device of the present invention can be disposed at a low position where the assembly, maintenance and inspection of the device can be easily effected without any danger. As the bus disposed at its low position is less sensitive to vibrations, the entire equipment can be improved in resistance to earth quakes. Also buses can be installed at low positions and in compact manner without limitations due to the lightning arrester devices and therefore miniature substations can be economically constructed. The advantages as above described are also obtained with electrical equipments other than the bus which are to be connected to the lightning arrester device of the present invention.

As the height of a bus or any other electrical equipment can be selected at will within a range in which the plate-shaped conductor 24 extends, the present invetion is applicable to any miniature substation including a wide variety of electrical equipments without the entire construction of the substation subjected to dimensional limitations due to the external dimension of the lightning arrester devices. Accordingly the present invention provides a lightning arrester device most suitable for use with a gas insulation type miniature substations.

While the present invention has been illustrated and described in conjunction with a single preferred embodiment thereof it is to be understood that numerous changes and modifications may be resorted to without departing from the spirit and scope of the present invention. For example, the present invention is equally applicable to lightning arrester devices with the series gap having the prior art type construction.

What is claimed is:

1. A lightning arrester device comprising a housing, a main arrester body disposed within said housing axially thereof, a first electrical conductor extending from a higher voltage end of said main arrester body in a direction of length of said main arrester body to be disposed along said main arrester body, and a second electrical conductor connected to said main arrester body through said first electrical conductor to be disposed substantially perpendicularly to the longitudinal axis of said main arrester body.

2. A lightning arrester device as claimed in claim 1 wherein said first electrical conductor is disposed so as to improve a potential distribution along said main arrester body resulting from an electrostatic capacity developed between said main arrester body and said housing.

3. A lightning arrester device as claimed in claim 1 wherein said main arrester body is formed of a plurality of nonlinear resistors composed of sintered zinc oxide and serially interconnected in superposed relationship.

4. A lightning arrester device as claimed in claim 1 wherein said second electrical conductor is located between both ends of said main arrester body.

5. A lightning arrester device as claimed in claim 1 wherein said housing includes a tubular section extending therefrom to be substantially perpendicular to the longitudinal axis thereof and wherein an electrically insulating spacer is disposed at an end of said tubular section to closes hermetically said tubular section and supports said second electrical conductor.

6. A lightning arrester device as claimed in claim 1 wherein said second electrical conductor is connected to said first electrical conductor through a connection seat, said connection seat being welded to said first electrical conductor and bolted to said second electrical conductor.

7. A lightning arrester device as claimed in claim 1 wherein said second electrical conductor is connected to a horizontally disposed bus.

8. A lightning arrester device as claimed in claim 7 wherein said bus formed of an enclosed sheath filled with an amount of an electrically insulating gas and a central electrical conductor disposed in said sheath.

9. A lightning arrester device as claimed in claim 1 wherein said housing is filled with an amount of an electrically insulating gas.

10. A lightning arrester device as claimed in claim 9 wherein said electrically insulating gas coprises sulfur hexaoxide ($SF_6$).

11. A lightning arrester device as claimed in claim 1 wherein said housing is connected to ground.

* * * * *